Patented Dec. 29, 1931

1,839,062

UNITED STATES PATENT OFFICE

ROY G. TELLIER, OF WARREN, PENNSYLVANIA, ASSIGNOR TO FRED B. JACKSON, OF WARREN, PENNSYLVANIA

SUBSTANCE PREPARATION

No Drawing.   Application filed May 23, 1929. Serial No. 365,563.

In my pending application, Serial No. 166,014, I have set forth a description of that peculiar argillaceous substance known as Florida fuller's earth, in which I have dwelt upon its unique submicroscopic cellularity and its so-called porosity, properties the possession of which enables it to take up, into its structure, more than its own weight of water, without change of dimensions and without crumbling down to mud; and I have therein disclosed how this kind of argil or clay may be dispersed by chemical treatment to colloid-sol state or form, as by subjecting the clay to the action of a comparatively weak acid-solution (e. g., a solution of sulphuric acid of 25% strength by volume). In the aforementioned application, I have furthermore disclosed a method of making a composite argillaceous-and-organic colloid gel by treating this clay with liquor (commonly known as waste sulphite liquor) derived from the treatment ("cooking") of wood with calcium bisulphite and concentrated and acidified (as by the addition of sulphuric acid).

In another method of obtaining the cellulosic constituent of wood, the wood is "cooked" with caustic soda; that is, in this so-called caustic-soda method, caustic soda is used instead of the calcium bisulphite employed in the process just alluded to. As a by-product of the caustic-soda method, a liquer is obtained, that is, among papermakers and pulp-manufacturers, commonly called "spent soda-liquor", from which, by suitable treatment, caustic soda may be recovered.

Much difficulty is experienced in carrying out the concentration of waste sulphite liquor, because of its intensely corrosive nature that is due to its containing sulphuric acid in the presence of other substances, such as calcium sulphate, salts of organic acids, and organic matter; and, in my pending application Serial No. 185,924, I have disclosed a method of preparing a liquor for treating substances (e. g., Florida fuller's earth), in the presence of organic matter, to produce a composite argillaceous-and-organic colloid gel, by mingling waste sulphite liquor with spent soda-liquor (whereby the acid nature of the waste sulphite liquor is neutralized), concentrating the resulting mixture, and then adding acid thereto.

In the preparation of composite argillaceous-and-organic colloid gels, I have discovered that, in lieu of the stronger acids, aqueous solutions of the alkali hydroxides (preferably, for reasons of economy, sodium hydroxide) may be substituted. While ordinary clays (e. g. kaolin) are not dissolved or even appreciably decomposed by solutions of the caustic alkalis, unless pressure and temperature conditions are higher (as in an autoclave) than in the case of water boiling in the open, yet clay of the nature of Florida fuller's earth is, due to its unique submicroscopic cellular structure, readily acted upon and molecularly decomposed by aqueous solutions of the caustic alkalis, without necessarily using pressures and temperatures higher than obtain at the boiling point of water in the open. Increasing pressures and temperatures will, in direct ratio to the degree of intensity thereof applied, reduce the time of contact and the strength of solution necessary for effecting molecular decomposition and colloidal dispersion of Florida fuller's earth; so, in some cases, it may be found more feasible and economical to use them. But it is to be distinctly understood that, for the cheap and practicable carrying out and utilization of this invention on a commercial scale, only ordinary atmospheric pressure and temperatures at or even under the boiling point of water are required in the processing. This is because the unique submicroscopic cellularity of Florida fuller's earth, together with its so-called porosity, enables this peculiar kind of clay to take up, into its cellular structure, the aqueous solution of the alkali in such manner that there is a submicroscopic, ultraminute subdivision and mingling of the substance of the clay with the alkali, with the result that the alkali is enabled readily and quickly to decompose, disrupt and disperse the original molecular arrangement of the structure of the clay, and that the alkali enters into chemical and/or physical union with the constituents thereof.

If, now, a solution of organic matter is present, when the caustic alkali enters into the submicroscopic-cell structure of the Florida fuller's earth and disrupts and disperses its original physical and molecular arrangement, the caustic alkali will concurrently come into ultraminute and ultraintimate contact with the molecules and/or colloid-size (submicroscopic) particles of the organic substance, as well as with the submicroscopic-cell structure of the clay, and this occurs in such manner that a new form of substance results; that is to say, there results a chemical and/or physical molecular union of all the original elements of the clay substance, the water, the alkali and the organic substance present. At the moment of the disruption and dispersion of the clay, there appears to occur an action of the organic substance that causes the mineral elements to exist temporarily in the colloid-sol state or form. Since certain mineral salts that are formed as by-products of the reaction are pectizing in their nature, there is formed, in the presence of these pectizing agents, a colloid gel having practically the same physical state and arrangement as the colloid gels produced by the acid methods disclosed in my pending application Serial No. 166,014 aforementioned. As is set forth therein, the constituents of the latter gels do not necessarily enter thereinto in stoichiometrical proportions but may enter in indefinite proportions; and I have ascertained that the possible molecular arrangements of the colloid gel prepared according to the present invention may exist in indefinite proportions. In other words, when a caustic alkali, in lieu of an acid, is employed for dispersing the Florida fuller's earth, as hereinbefore set forth, the organic matter may enter into union, in the resulting colloid gel, with the mineral elements and the water, in wholly indefinite proportions, that is, in any and all proportions throughout a wide range, as do the constituents of an alloy.

The colloid gel thus formed is then predried at carefully selected moderate temperatures; and, after this predrying, it is subjected to heat-treatment out of contact with air and at temperatures high enough to bring about dehydration of the colloid gel and destructive distillation of its organic constituent, whereby the organic constituent of the gel is charred and carbonized, and the gel itself becomes hard and possesses charcteristics analogous to those of an alloy; which steps do not vary materially from the corresponding steps to which is subjected the colloid gel obtained as a product of the acid method described in my pending application Serial No. 166,014 hereinbefore mentioned. During the dehydration and destructive-distillation of which mention has just been made, by-products in the nature of mineral salts are freed, being apaprently forced out of union with other molecules of the gel substance and thus permitting their removal without disruption or even disturbance of the resulting clay-carbon alloylike structure. These by-products are, in the case of the gel produced according to the present invention, principally sodium-mineral salts; and, since they are quite water-soluble, they are readily removed by leaching. So far as its mechanical features are concerned, this leaching step does not differ materially from the corresponding leaching step of the acid method described in detail in my pending application Serial No. 166,014, to which reference has hereinbefore been made. By the escape of the gases arising from the destructive distillation produced by the heat-treatment of the gel, there is conferred on the substance a cellular structure; and this cellularity of structure is further enhanced by the leaching out of the by-product mineral salts just mentioned.

In embodiments of the acid method described in my pending application Serial No. 166,014, there is used waste sulphite liquor that has been concentrated and to which an acid (e. g., sulphuric acid) has been added, the acid acting to disperse the Florida fuller's earth and the acidified waste sulphite liquor serving as a vehicle or source of organic matter and pectizing and mordanting salts. This acid method therefore affords a means of making profitable commercial use of a by-product of wood treatment, namely, waste sulphite liquor, that would otherwise be rejected as worthless. But, as has hereinbefore been set forth, there is another method of treating wood for obtaining its cellulose content, in carrying out which method caustic soda is used instead of calcium bisulphite and a by-product of which method is spent soda liquor instead of waste sulphite liquor. This spent soda liquor may be used in carrying out the present invention, although such liquor is much more expensive than is waste sulphite liquor; and that it lends itself economically to such use results from the fact that the valuable sodium salts may be recovered in the step of leaching the clay-carbon alloylike substance that results from the heat-treatment of the colloid gel obtained by the action of the spent soda liquor on the Florida fuller's earth.

In my pending application Serial No. 166,014, I have disclosed the use of acidified waste sulphite liquor, that is, waste sulphite liquor the inherently acid nature of which is reinforced and strengthened by the addition of an acid, such as sulphuric acid. According to the present invention, there may be used as a vehicle for carrying the clay-dispersing agent, organic matter and pectizing and mordanting salts to the Florida fuller's earth and mingling them therewith, spent soda liquor the inherently caustic nature of which has been enhanced by the addition of a suitable alkali. An advantage obtained by the use of spent soda liquor so modified, instead of acidified waste sulphite liquor, resides in the fact that the by-product mineral salts that remain to be removed from the colloid gel in the leaching step that follows the heat-treatment (or dehydration and destructive distillation step) are very soluble in water, being principally salts of sodium and water-soluble salts of aluminum; whereas, when acidified waste sulphite liquor is used, one of the by-product mineral salts that remain to be removed from the colloid gel is calcium sulphate, which is only slightly soluble in water and which requires much time and large quantities of water for its removal by leaching.

In my pending application Serial No. 185,924, I have disclosed a method of preparing an acidified mixture of waste sulphite liquor and spent soda liquor. Another vehicle by which the clay-dispersing agent, organic matter, and pectizing and mordanting salts may be carried to and mingled with the Florida fuller's earth, may be prepared by neutralizing the inherently acid nature of waste sulphite liquor by mingling therewith spent soda liquor and then rendering caustic the mixture so obtained by adding thereto a suitable alkali.

In my pending application Serial No. 166,014 hereinbefore mentioned, there are set forth several ways of making a colloid gel by acting upon Florida fuller's earth with suitable acid treating liquids. Any of the caustic treating liquids hereinbefore described may be substituted for the acid treating liquid and the method may then be carried out as described in that application (Serial No. 166,014) without any other change in principle. Hereinafter follow examples showing how the present invention may be carried out in practice.

Spent soda liquor is brought to a concentration indicated by twenty degrees (20°) Baumé; at that degree of concentration, the liquor contains about thirty-five per cent. (35%) of organic solids. A quantity of this concentrated spent soda-liquor that will provide from, say, thirty pounds to forty pounds of the organic solids is taken for use. One hundred pounds (100 lbs.) of Florida fuller's earth in granular form is weighed out; and, to the concentrated spent soda-liquor, there is added a solution of sodium oxide, which is prepared by dissolving about twenty per cent. (20%) of the weight of the clay (or twenty pounds) in a quantity of water sufficient to provide a solution of sodium hydroxide of thirty per cent. (30%) strength. The caustic treating liquid obtained by adding this aqueous solution of sodium hydroxide to the concentrated spent soda-liquor is then brought into intimate contact with the above-named weight of granular Florida fuller's earth in any of the ways described in my pending application Serial No. 166,014 in which acidified treating liquid (e. g., acidified concentrated waste sulphite liquor) is employed to act upon Florida fuller's earth for the purpose of preparing a composite argillaceous-and-organic colloid gel. The subsequent treatment (predrying, dehydration, destructive distillation and leaching) of the colloid gel so obtained by the action of the caustic treating liquid upon the clay does not differ in principle from the corresponding treatment of the colloid gel described in my pending application Serial No. 166,014.

Should it be desired to obtain an end-product having a carbon content still higher than that of the end-product yielded by the colloid gel gotten by the method of the example just given hereinbefore, the following method may be employed: The spent soda-liquor is brought to the same degree of concentration as before (that is, a degree of concentration represented by twenty degrees (20°) Baumé). Into intimate contact with one hundred pounds (100 lbs.) of Florida fuller's earth in granular form, there is brought a quantity of this concentrated spent soda-liquor that will provide from, say, fifty pounds to fifty-five pounds (50 lbs.–55 lbs.) of the organic solids; this may be done in the cold but it is preferably done in the hot. After the clay mass has absorbed and adsorbed all the liquor so added to it, and transformation into the colloid gel form or state has occurred, it is dried to dryness at moderate temperatures; such temperatures should not materially exceed the boiling point of water (212° F.), so as to insure that there may not take place any premature carbonization of the organic constituent of the colloid gel, or a conversion of too high a proportion of the colloid gel into the irreversible set gel form. Next, to the resulting dried mass, there is added an aqueous solution of sodium oxide that is obtained by dissolving a quantity of sodium oxide weighing from, say, twenty-five per cent. to thirty per cent. (25%–30%) of the weight of the clay (that is, from twenty-five pounds to thirty pounds of sodium oxide) in such a quantity of water that there results an aqueous solution of sodium hydroxide of from, say, thirty-five per cent. to forty-five per cent. (35%–45%) strength. The wetted mass is next redried to dryness; at the beginning of this redrying step, the temperature should not materially exceed the boiling point of water, but, as the redrying progresses and after the free water has been driven off, the temperatures are increased progressively and the dried gel substance is subjected to dehydration and its organic constituent to destructive distillation, whereby the organic constituent is carbonized and the colloid gel is thoroughly dehydrated. The subsequent steps of leaching and drying again are carried out in much the same way as are the corresponding ones to which the gel substance of my pending application Serial No. 166,014 is subjected.

One reason that it is best to add the liquor to the Florida fuller's earth before adding the caustic-alkali solution, in the case wherein it is desired to obtain, in the end-product, a higher proportion of carbon than is usually required, may be set out as follows: Larger quantities of the spent soda-liquor and of the caustic-alkali solution are used in this case; and, if these larger quantities of the liquor and the solution are first mixed together with the quantities of water requisite to give the proper degree of concentration or of viscosity of the liquid mixture, the total volume thereof will be too great relative to the proportion and volume of the clay to permit of the proper absorption, adsorption and dispersion of the latter by the liquid mixture in such manner that proper chemical and/or physical actions and results may take place.

Where it is desired to obtain a higher proportion of carbon in the clay-carbon alloy-like end-product that results from carrying out any of the methods which are described in my pending application Serial No. 166,014 and which involve the use of an acidified treating-liquid, a similar modification of such methods may be made as has just been described hereinbefore in connection with carrying out the present invention.

As in the case of the methods described in my pending application Serial No. 166,014, there may be used, for the inorganic phase in carrying out the present invention, inorganic materials other than Florida fuller's earth and substances that are of the nature thereof and that possess its unique submicroscopic cellular structure. For example, other kinds of clay (e. g., kaolin, bentonite) may be substituted for Florida fuller's earth as the mineral phase, but the use of these other kinds of clay imposes the burden of greater expense brought about by the necessity of decomposing and dispersing them by physical means, which may be accomplished by subjecting them to prolonged wet-grinding (as with a mortar and pestle, or in a ball-mill, or by means of a colloid-liquid-attrition mill), combined with the chemical action of the caustic alkali, until there is attained that degree of ultra-subdivision of the clay in which it is caused to assume the colloid form, that is to say, that degree of fineness of particle in which the individual particles are of ultra-microscopic size and which may be properly characterized and classified as being of true colloid state or form. In this form, the dispersed mineral substance is capable of entering into chemical and/or physical union with water and/or with other liquids and substances. However, the mode of procedure hereinbefore set out for and involving the use of clays of the nature of Florida fuller's earth, is, for reasons of economy, preferred.

In my pending application Serial No. 166,014, detailed conditions of operation throughout all the steps of the processing in which acidified treating-liquids are used, are fully set forth; and, in using caustic treating-liquids of the present invention instead of these acidified treating-liquids of my prior application just mentioned, the same or similar detailed conditions of operation are to be observed throughout the steps of the processing, for reasons that are the same as or similar to those explicitly given in that application.

Moreover, in my pending application Serial No. 166,014, there are mentioned many organic substances that are capable of serving as the organic phase in the preparation of the colloid gel described in that application; among such substances there may be named an unlimited variety of organic substances of a waste or semi-waste nature derived from industrial plants as a source, and organic substances of a cellulosic nature, such as wood, waste wood, sawdust, straw and other plant-nature materials. Such organic materials lend themselves as suitable for use in carrying out the present invention in those instances in which, when they are treated with caustic alkali solutions, either in the cold or as digested with heat and pressure, practically the whole of their substance becomes molecularly dissolved and/or colloidally dispersed in the caustic-alkali solutions hereinbefore described. Furthermore, there may be used sugar solutions, either waste or semi-waste or even pure. When a solution of sugar or any other organic substance is substituted for the organic phase of spent soda-liquor, there may be used approximately the same degree of concentration of the solution and approximately the same proportion of organic solids relative to a given weight of the Florida fuller's earth as when spent soda-liquor of the concentration hereinabove mentioned (namely, twenty degrees Baumé) is used. In the case of the use of sugar solutions, even when the sugar of the solution is practically pure, the action of the sugar can apparently be, in the preparation of the hydrogel, at first a peptizing action and then later a pectizing action; that is, there occurs a reversal of rôle played by the sugar and, in the later part of the reaction, the sugar aids the pectizing action of such other pectizers as may be present. Again, when the sugar of the solution is at first momentarily acting as a peptizer, it apparently is aided as such and also in maintaining, for whatever extremely brief period of time may be necessary, the decomposed earth in the colloid sol form until the earth has become mingled and combined with the constituents of the treating liquid, by the solution of sodium silicate that results at first in a weak form from the chemical reactions between the earth and the caustic soda; and this peptizing action of the sodium silicate in its form of a weak solution is of the same nature as the peptizing action of the weak solution of the same salt that is formed when spent soda-liquor is used as the source or vehicle of the organic-phase raw-material; as the reaction progresses, the solution of sodium silicate gains strength and its action changes from a peptizing one to a pectizing one. When use is made of waste or semi-waste sugar-solutions, there comes into play, in addition to the variant rôle taken by the sugar and hereinabove mentioned, the additional peptizing aids and agents in the form of the impurities carried by the sugar, among which impurities there may be mentioned tannin bodies, organic acids, weak alkalis, as well as non-crystallizable sugar impurities and other impurities that are non-sugar impurities. Most, if not all, of such impurities may, after performing their initial function as peptizers, act afterwards as pectizers when there has taken place the union of the decomposed and colloidally dispersed earth with the constituents of the treating liquid.

An aqueous solution containing twenty-five per cent. (25%) by weight of caustic soda (sodium hydroxide) has been found to work efficaciously to decompose and disperse Florida fuller's earth to the colloid sol state under ordinary atmospheric pressure and at temperatures in the neighborhood of 212° F. However, in the case of ordinary clays, such as kaolin and bentonite, it is necessary, in order to effect any substantial degree of decomposition and dispersion thereof, either to use much higher temperatures and pressures than the ones just mentioned hereinabove, when employing an aqueous solution of sodium hydroxide of the strength described; or else to use a supersaturated solution of the sodium hydroxide at temperatures much higher than 212° F. In the effecting of the decomposition and dispersion of the clays, not only are the strength of the sodium-hydroxide solution and the temperature and pressure existing at the time of its employment, of great importance, but also the proportions of the solution and the clay are of weight and consequence. Thus, in the dispersion of Florida fuller's earth to the colloid sol state, by treating it with a solution of hydroxide of sodium of 25% strength by weight, as hereinabove set forth, there may be used, with good results, thirty to thirty-five pounds of the solution for every one hundred pounds of the Florida fuller's earth.

For use in the so-called contact method for the pre-clarification and pre-decolorization and pre-purification, in part, of sugar liquors, syrups, juices and the like (and possibly other industrial uses), wherein a fine-mesh material in contradistinction to granular substance is employed, it is practicable to prepare, as a first-stage product, a colloid gel (here a hydrogel) by acting on fine-mesh Florida fuller's earth with spent soda-liquor in just that form and of that strength in which it comes from the digesters in paper and pulp plants, that is, without rendering it more caustic by the addition of more sodium hydroxide, for example. The resulting hydrogel is subjected to heat-treatment and washing and is in that way converted into an irreversible set gel by carrying out the steps hereinbefore described in connection with the treatment of the hydrogels obtained by other methods. After the spent soda-liquor has been thus employed to obtain an irreversible set-gel, it is practicable to treat the liquor so as to obtain from it soda salts that may be used in the paper and pulp plants again, whereby economy of operation results.

In the preparation and use of a treating-liquid composed of a solution of a caustic alkali (e. g., sodium hydroxide) and organic matter for acting upon argillaceous material (e. g., Florida fuller's earth), care must be taken that the treating-liquid be not too dense (thick) else it will not properly penetrate the granules of the earth, and that the volume of the treating-liquid used in proportion to the earth be not too great, else there may occur a separating-out of by-product salts and an uneven dissemination of these salts throughout the hydrogel in the course of the pre-drying step. However, the caustic alkali may, in the preparation of the treating-liquid, be added to the liquor containing the solid organic matter, in the full strength of the alkali or even in the form of a saturated solution without its producing a detrimental action on the organic matter, such as a charring action thereon. The greater the strength of the caustic-alkali solution, the greater will be its hydrolizing (hydrating) action on the organic solids in the liquor and the greater the dispersion and the maintenance of such organic solids in either molecular or colloidal solution and suspension thereof; but, of course, as mingled with the organic-substance solution, the caustic-alkali solution must not be of too great strength, else the resulting treating-liquid will be too thick and viscous and therefore incapable of properly penetrating the granules of the earth; preferably, the proportion of organic solids to earth granules should not vary greatly from one part by weight of organic solids to, say, three parts (or, at most, two and one half parts) by weight of the earth granules.

In the reactions that follow the mingling of the treating-liquid (composed of caustic alkali and organic matter) with the earth, there are formed both sodium silicate and sodium aluminate. Hereinabove allusion has been made to the reversal of the rôle played by the sodium silicate, its action being that of a peptizer in its first-formed weak solution and later that of a pectizer as its solution gains strength as the reactions proceed. Sodium aluminate appears to be more intense in its pectizing action than does sodium silicate; and it is probable that, after the weak solution of the freshly-formed sodium silicate has aided and facilitated, in its capacity of a momentary peptizing agent, the peptizing action of the concurrently present organic peptizing agents among the organic (soda-lignone) substances (in case spent soda-liquor is employed), and, after the union of the inorganic and organic constituents of the mixture has taken place, the new molecular arrangement so produced is acted upon, pectized and coagulated by the action of the sodium aluminate reinforced by that of the sodium silicate the rôle of which has changed from that of a peptizer to that of a pectizer, so that there results a coalescing of the newly formed molecules into the form of a colloid gel, in this particular case a hydrogel.

Weak spent soda-liquor, as it comes from the digesters, varies little from what may be regarded as a normal or standard form or composition, of which approximately ten per cent. (10%) is solids; and such variations as it does actually show are negligible when it is used for the purposes hereinbefore set forth. These solids are principally sodium-lignone salts. None of the organic acids that are found in waste sulphite liquor is to be found in spent soda-liquor; even the tannin and saccharine bodies inherent in the original wood substance are found in combination with sodium as complex forms of organic and sodium tannates and sucrates etc.; and, of course, the sodium would not form additional saccharine substances from some of the fractions of the wood substance, such as are formed by the sulphur-oxide acids in the sulphite process. In short, all of the non-cellulosic constituents of the wood, and even some of the cellulose itself, appear to be in various forms of combination with the sodium oxide and sodium hydroxide; and there are also excess or free sodium salts, the degree of excess alkalinity due to which is practically the same as the degree of excess acidity due to the free acids of weak waste sulphite liquor. In the preparation of a caustic-alkali treating-liquid by neutralizing the acid nature of waste sulphite liquor by adding thereto caustic alkali and then giving to the neutralized liquor an alkaline nature by the addition of still more caustic alkali, as has been described in the foregoing, the degree of alkalinity finally conferred on the liquor may well be that of weak spent soda-liquor.

In accordance with the provisions of the patent statutes, I have hereinbefore described the best mode now known to me of carrying this invention into effect; but I desire it to be distinctly understood that I fully realize that changes may be made therein and that I intend to include within the scope of the claims that follow hereinafter all modifications that do not depart substantially from the spirit of the invention set forth therein and thereby.

I claim:

1. Preparation of an argil-carbon gel comprising preparing an argillaceous-and-organic colloid gel by acting upon argil with an alkaline liquor in the presence of organic matter; and dehydrating the colloid gel at temperatures sufficiently high to cause destructive distillation of the organic component of the colloid gel.

2. Preparation of an argil-carbon gel comprising preparing an argillaceous-and-organic colloid gel by acting upon argil with alkaline liquor in the presence of organic matter; dehydrating the colloid gel at temperatures sufficiently low to prevent substantial destructive distillation of the organic component of the colloid gel; treating the dehydrated colloid gel with a solution of alkali hydroxide; and dehydrating the resulting substance at temperatures sufficiently high to cause destructive distillation of its organic component.

3. Preparation of an argil-carbon gel comprising preparing an argillaceous-and-organic colloid gel by treating argillaceous substance with by-product liquor from the cooking of woody substance; dehydrating the colloid gel at temperatures sufficiently low to prevent substantial destructive distillation of its organic component; treating the dehydrated colloid gel with a solution of the same nature as to acidity and alkalinity as the by-product liquor; and dehydrating the resulting substance at temperatures sufficiently high to cause destructive distillation of its organic component.

Signed at Warren, in the county of Warren and State of Pennsylvania, this 17th day of May 1929.

ROY G. TELLIER.